United States Patent [19]

Steenburg

[11] Patent Number: 4,872,692
[45] Date of Patent: Oct. 10, 1989

[54] CONVERTIBLE CARRIAGE WITH BIASED WHEEL RETRACTION

[75] Inventor: Kip V. Steenburg, Sudbury, Mass.
[73] Assignee: Prodigy Corp., Concord, Mass.
[21] Appl. No.: 202,720
[22] Filed: Jun. 3, 1988
[51] Int. Cl.$^4$ .............................................. B62B 11/00
[52] U.S. Cl. ..................... 280/30; 280/643; 280/648; 297/130; 297/250
[58] Field of Search ................... 280/30, 37, 643, 647, 280/648; 108/131, 133; 474/101, 113; 297/17, 130, 131, 250

[56] References Cited

U.S. PATENT DOCUMENTS

| | | | |
|---|---|---|---|
| 1,118,931 | 12/1914 | Hasley | 280/43.13 X |
| 1,688,579 | 10/1928 | Franks | 474/130 |
| 2,541,327 | 2/1951 | Billinghurst | 280/7.1 |
| 2,706,642 | 4/1955 | Yarnell | 280/643 |
| 2,729,276 | 1/1956 | Volney | 297/17 |
| 3,679,223 | 7/1972 | Sakal | 280/37 |
| 4,575,109 | 3/1986 | Cowdery | 280/37 |
| 4,736,959 | 4/1988 | Steenburg | 280/30 |

FOREIGN PATENT DOCUMENTS

| | | | |
|---|---|---|---|
| 1112005 | 3/1956 | France | 280/30 |
| 421113 | 5/1947 | Italy | 280/37 |
| 80838 | 10/1952 | Norway | 280/30 |

*Primary Examiner*—Charles A. Marmor
*Assistant Examiner*—Michael Mar
*Attorney, Agent, or Firm*—Joseph S. Iandiorio; Brian M. Dingman

[57] ABSTRACT

A convertible carriage having a wheel retraction mechanism to provide biased wheel retraction. The carriage has a superstructure including a seat for carrying a person to be transported, a plurality of wheels, and a plurality of leg members pivotably interconnected with the superstructure for rollably supporting the wheels to transport the superstructure when leg members are in an extended position below the superstructure. The carriage further includes a drive mechanism for relocating the leg members between a retracted position and an extended position, and a biasing mechanism, connected to the drive mechanism, for driving the leg members to the retracted position. The drive mechanism loads the biasing mechanism when the leg members are driven to the extended position. There is also a mechanism locking the leg members in the extended position to inhibit retraction by the biasing mechanism.

4 Claims, 4 Drawing Sheets

CONVERTIBLE CARRIAGE WITH BIASED WHEEL RETRACTION

FIELD OF INVENTION

This invention relates to a wheeled carriage for transporting a person such as a child, the carriage having structure to retract the wheels concurrently, and more particularly to such a carriage having a mechanism which positively retracts the wheels into a retracted position.

BACKGROUND OF INVENTION

Traveling with a child requires accessories such as a car seat and a carriage which perform several important functions. A car seat is necessary for safely transporting the child in a vehicle. After arriving at a destination, the child must be removed from the vehicle and brought along with the parent. A carriage provides easy and convenient transportation for the child.

Presently, there are few devices which can function both as a car seat and as a carriage. There are even fewer devices which enable the child to remain within the carriage during conversion from a car seat to a carriage and back to a car seat.

One convertible carriage is described in U.S. Pat. No. 4,736,959, by Kip Van Steenburg. This carriage allows the operator to move the wheels concurrently between an extended position in which the device serves as a stroller and a retracted position in which a car seat is achieved. However, the wheels must be moved manually into the retracted position. During retraction, leg members supporting the wheels are unlocked and the carriage descends to the ground. Thereafter, the operator must forcibly lift a cross member, which interconnects the rear leg members, with her foot to complete the retraction of the wheels. The cross member is typically lifted with the upper portion of the toe which can scrape and mar the shoe.

SUMMARY OF INVENTION

It is therefore an object of this invention to provide an improved convertible carriage having an automatic wheel retraction mechanism.

It is a further object of this invention to provide such a convertible carriage which fully retracts the wheels of the carriage without effort by the operator of the carriage.

It is a further object of this invention to provide such a convertible carriage which does not scrape or mar the shoes of the operator during retraction.

It is a further object of this invention to provide such a carriage which positively locks the wheels in the extended position until retraction is desired.

Yet another object of this invention is to provide an improved wheel retraction mechanism for use in a carriage convertible from a stroller to a car seat.

This invention results from the realization that a truly effective stroller convertible into a car seat can be achieved by a carriage having a retraction mechanism which biases the wheels into a retracted position when the wheels are released from an extended, stroller position so that the stroller automatically and conveniently converts into a car seat.

This invention features a convertible carriage with biased wheel retraction, including a superstructure having seat means for carrying a person to be transported, a plurality of wheel means, and a plurality of leg members pivotably interconnected with the superstructure for rollably supporting the wheel means to transport the superstructure when leg members are in an extended position below the superstructure. There are also drive means for relocating the leg members between a retracted position and the extended position, and biasing means, connected to the drive means, for driving the leg members to the retracted position. The drive means loads the biasing means when the leg members are driven to the extended position. The carriage further includes means for locking the leg members in the extended position to inhibit retraction by the biasing means.

In one embodiment, the biasing means includes elastic means connected between the drive means and the superstructure. The drive means includes first drive means for moving at least one of the leg members to the extended position, and second drive means for interconnecting the remaining leg members and the first drive means to drive the remaining leg members to the extended position. The first and second drive means may include first and second pulley means, each pulley means being operatively connected to at least one leg member. The second drive means further includes cable means interconnecting the first and second pulley means to drive the pulley means and their corresponding leg members concurrently. The biasing means includes spring means connected between the cable means and the superstructure. The first drive means may include a drive member to which force is directly applied by an operator of the carriage.

In another embodiment, the leg members are arranged in a front set and a back set. The drive means includes a bar interconnecting one of the front and back sets, to which force is applied by an operator of the carriage. The bar can interconnect the leg members of the back set and be actuated by the foot of the operator. The drive bar includes first and second drive members spaced from each other. The first drive member is accessible to the foot of the operator to accomplish initial drive of the leg members from the retracted to the extended position and the second drive member is accessible to the foot of the operator to accomplish the final drive to the extended position. The first and second drive members extend longitudinally between the leg members of the back set and define between them a space in which the toe of the operator is insertable. The means for locking includes transition locking means for locking the leg members in an intermediate position between the extended and the retracted positions to enable the operator to transfer the foot from one of the first and second drive members to the other of the drive members.

In yet another embodiment, the means for locking includes means for engaging the drive means to inhibit retraction of the leg members. The means for locking further includes means for forcing the means for engaging into engagement with the drive means. The carriage further includes safety means for selectively inhibiting disengagement of the means for locking, and means, actuated by an operator of the carriage, for selectively disengaging the locking means. The means for disengaging includes grip means and a linkage interconnecting the grip means and the means for locking. The grip means may include a handlebar which is grasped by the operator of the carriage to selectively disengage the means for locking.

This invention also features a wheel retraction mechanism for use in a carriage convertible from a stroller to a car seat and having a plurality of wheels and a plurality of leg members rollably carrying the wheels, the mechanism including drive means which include first drive means for moving at least one of the leg members to an extended position, and second drive means for interconnecting the remaining leg members and the first drive means to drive the remaining leg members to the extended position. The wheel retraction mechanism further includes biasing mean for driving the leg members from the extended position to a retracted position. The drive means tensions the biasing means when the leg members are driven to the extended position. The mechanism further includes means for locking the leg members in the extended position to inhibit retraction by the biasing means.

DISCLOSURE OF PREFERRED EMBODIMENT

Other objects, features and advantages will occur from the following description of a preferred embodiment and the accompanying drawings, in which.

This invention may be accomplished by a convertible carriage having a superstructure and a number of leg members pivotably interconnected with the superstructure to rollably support a number of wheels. A drive mechanism relocates the leg members between a retracted position in which the convertible carriage serves as a car seat and an extended position in which the carriage operates as a stroller. The carriage according to this invention further includes a biasing mechanism connected to the drive mechanism to drive the leg members to the retracted position. The drive mechanism loads the biasing mechanism when the leg members are driven to the extended position. The leg members are locked in the extended position until retraction is desired.

Figure 1:
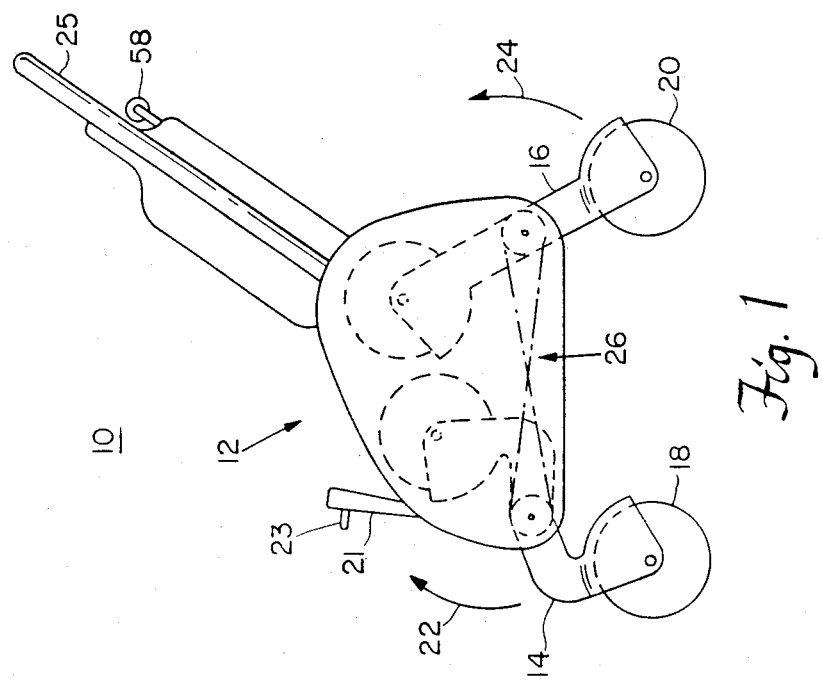
FIG. 1 is a side elevational view of a carriage according to this invention showing retraction of the wheels from an extended position to a retracted position.

Convertible carriage 10 according to this invention, FIG. 1, includes superstructure 12 supported by leg members 14, 16 which rollably support wheels 18, 20, respectively. Leg members 14, 16 are driven between the extended position as shown by solid lines to a retracted position within superstructure 12 as indicated by the dashed lines. The direction of retraction is indicated by arrows 22, 24 and is accomplished by wheel retraction mechanism 26. Carriage 10 further includes safety shield 21 having handle 23, and stroller handle 25.

Figure 2:
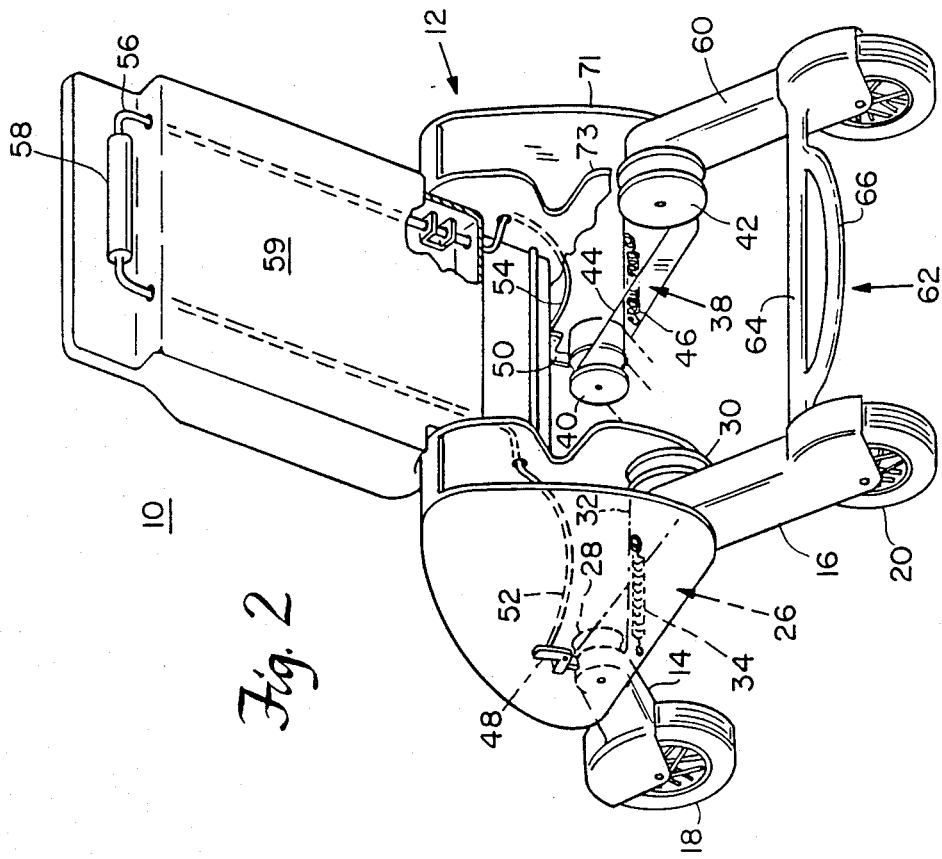
FIG. 2 is a partial cutaway, axonometric view of the carriage of FIG. 1.

Carriage 10 is shown in more detail FIG. 2, with handle 25 removed, in which wheel retraction mechanism 26 includes pulleys 28, 30 interconnected by cable 32 and spring 34 for driving leg members 14, 16 into the retracted position. Similarly, wheel retraction mechanism 38 includes pulleys 40, 42 interconnected by cable 44 and driven by spring 46. The pulley arrangement is similar to that shown in FIGS. 6 and 7 of U.S. Pat. No. 4,736,959 by Kip Van Steenburg, incorporated herein by reference.

The leg members are locked in the extended position by latches 48, 50 which are interconnected by linkages 52, 54 to handlebar 56 having padded grip 58. Handlebar 56 passes through back portions 59. Leg members 16, 60 are interconnected by drive bar 62 having first drive member 64 and second drive member 66, the operation of which is described below.

Figure 3:
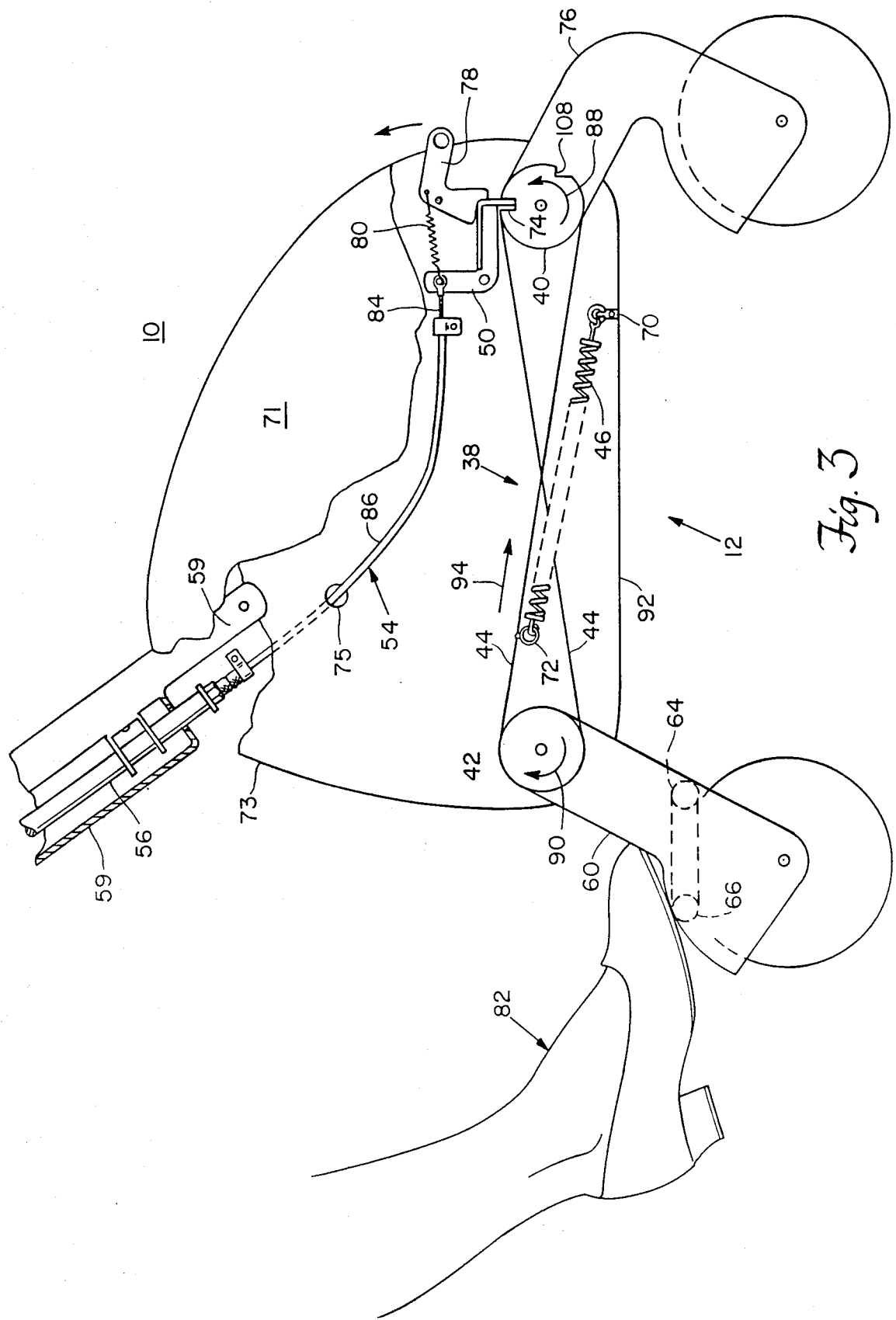
FIG. 3 is a more detailed cutaway, side view of the carriage in the extended position.

Outer wall 71 is cut away to reveal wheel retraction mechanism 38, FIG. 3. Inner wall 73 is cut away to show cable 54 which passes through opening 75 and attaches to handlebar 56, which in turn passes through back 59. In this construction, spring 46 is anchored to superstructure 12 by anchor 70 at one end and is secured at its other end to cable 44 by loop 72. Latch 50 engages recess 74 of front pulley 40 to lock leg members 60, 7 in the extended position. Safety latch 78 prevents inadvertent release of latch 50. Further, spring 80 forces latch 50 into engagement with recess 74.

To place carriage 10 into the retracted position, an operator of the carriage stands beside carriage 10 and grasps handle 23, FIG. 1, with one hand and grasps grip 58 with the other hand. Carriage 10 is then lifted. By pulling upwardly on grip 58, wire 84, FIG. 3 is drawn through sheath 86 of cable 54, spring 80 is tensioned, and latch 50 is raised from recess 74. Once freed, pulley 40 rotates in the direction indicated by arrow 88 while pulley 42 rotates in the direction shown by arrow 90. Spring 46 continues to retract in the direction shown by arrow 94, which draws leg members 60, 76 between walls 73, 75 to the retracted position as shown in FIG. 1.

Figure 4:
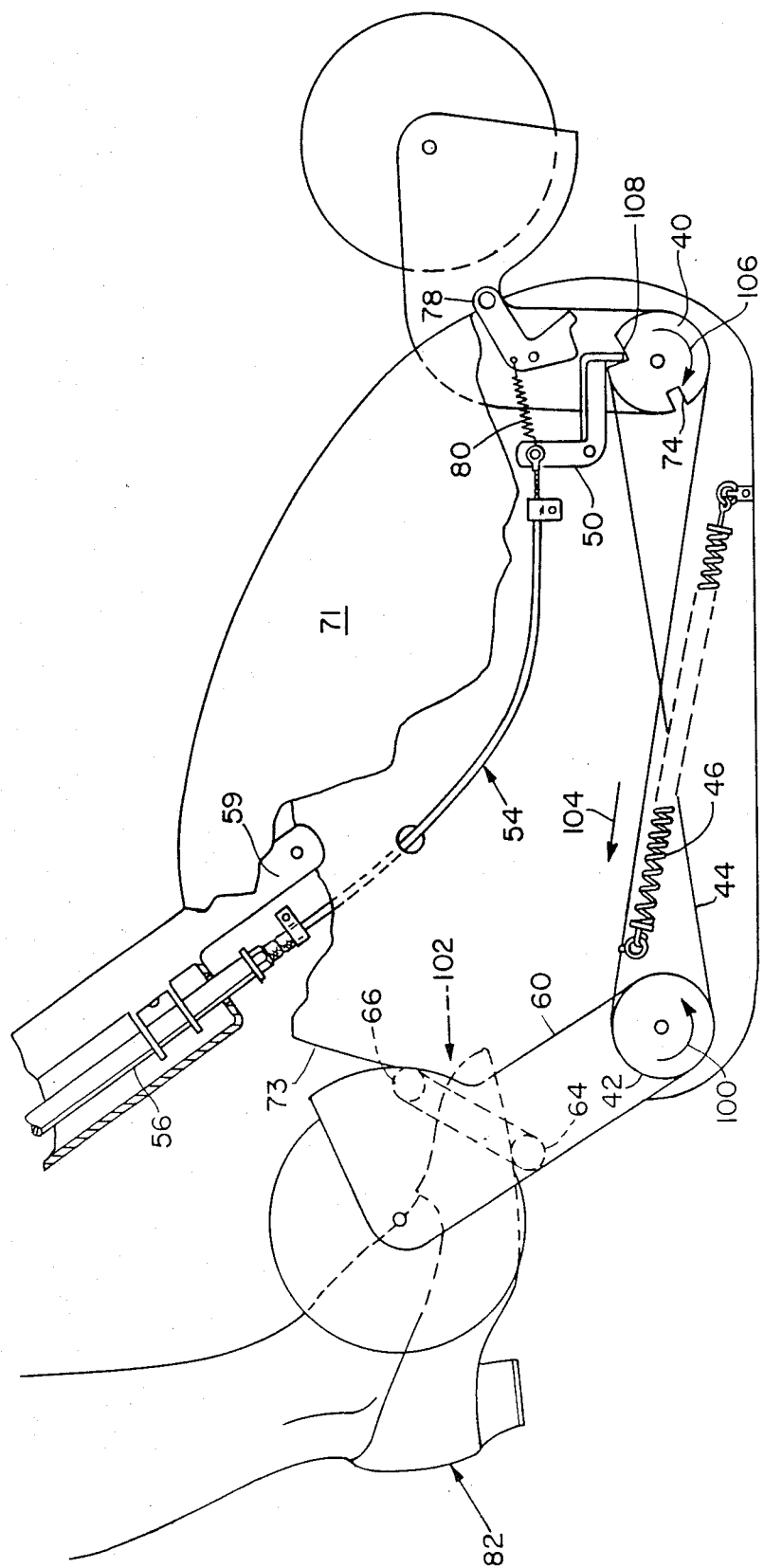
FIG. 4 is a similar view of the carriage shown in FIG. 3 in an intermediate position between extension and retraction.

To extend the leg members, the operator grasps stroller handle 25, FIG. 1, and places the sole of foot 82, FIGS. 3 and 4, onto drive member 64. By pushing downwardly, the rear set of leg members is moved in the direction indicated by arrow 100. Foot 82 rotates about first drive member 64 and the toe travels into opening 102. Spring 46 is cocked, that is, loaded, as spring 46 travels in the direction indicated by arrow 104.

An intermediate position is reached during extension. As pulley 40 rotates in the direction shown by arrow 106, recess 108 is presented to latch 50 at the intermediate position shown in FIG. 4. Spring 80 forces latch 50 into recess 108. With the leg members locked in the intermediate position, the operator can now transfer foot 82 from first drive member 64 to second drive member 66. More favorable leverage is achieved for the latter half of the extension to place the carriage in the extended position as shown in FIG. 3. Further, second drive member 66 would strike the upper portion of foot 82 if foot 82 was not relocated.

In another construction, the drive members are a number of pedals instead of bars, as illustrated. Also, instead of being directly actuated by hand, safety latch 78 can be connected by a linkage to a lever proximate grip 58, FIG. 2.

While the wheel retraction mechanism has been illustrated with a spring that is tensioned during extension, this is not a limitation of the invention. The biasing mechanism can be an elastic element which is compressed during extension to store sufficient energy to retract the wheels when retraction is desired. In other words, the term elastic includes resilient or deforming materials, as well as materials that can be tensioned by stretching.

Figure 5:
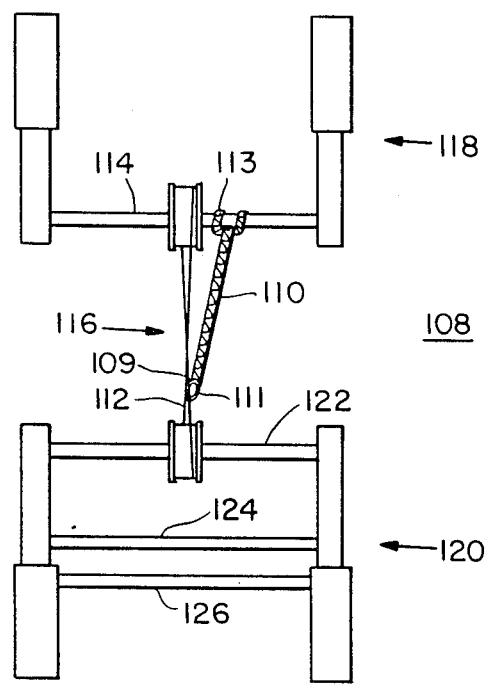
FIG. 5 is a schematic top view of an alternative retraction mechanism according to this invention.

Carriage 108 according to this invention is shown in top plan view with the superstructure removed in FIG. 5. In this construction an end of elastic strap 110., the biasing element, is not anchored directly to the superstructure. Instead, elastic strap 110 is anchored at one end to cable 112 and at its opposite end to shaft 114. A single retraction mechanism 116 drives both front set 118 and rear set 120 of leg members through shafts 116, 122. Shaft 114 pivots, but otherwise remains stationary relative to loop 111 so that end 109 travels relative to end 113 of strap 110. Rods 124, 126 serve as the drive members actuated by the operator during extension.

Although specific features of the invention are shown in some drawings and not others, this is for convenience only as each feature may be combined with any on all of the other features in accordance with the invention.

Other embodiments will occur to those skilled in the art and are within the following claims:

What is claimed is:

1. A convertible carriage with biased wheel retraction, comprising:
   a superstructure including seat means for carrying a person to be transported;
   a plurality of wheel means;
   a plurality of leg members pivotably interconnected with said superstructure for rollably supporting said wheel means to transport said superstructure when said leg members are in an extended position;
   drive means for relocating said leg members between a retracted position and said extended position, including first drive means for moving at least one of said leg members to said extended position, and second drive means for interconnecting the remaining leg members and said first drive means to drive the remaining leg members to said extended position, said first and second drive means respectively including first and second pulley means, each said pulley means being operatively connected to at least one leg member, and said second drive means further including cable means interconnecting said first and second pulley means to drive said pulley means and their corresponding leg members concurrently;
   biasing means, connected to said drive means, for driving said leg members to said retracted position, said drive means loading said biasing means when said leg members are driven to said extended position, including spring means connected between said cable means and said superstructure; and
   means for locking said leg members in said extended position to inhibit retraction by said biasing means.

2. A convertible carriage with biased wheel retraction, comprising:
   a superstructure including seat means for carrying a person to be transported;
   a plurality of wheel means;
   a plurality of leg members arranged in a front and back set and pivotably interconnected with said superstructure for rollably supporting said wheel means to transport said superstructure when said leg members are in an extended position;
   drive means for relocating said leg members between a retracted position and said extended position, including a drive bar, interconnecting the leg members of said back set, which is actuated by the foot of an operator of the carriage, said drive bar including first and second drive members spaced from each other, said first drive member accessible to the foot of the operator to accomplish initial drive of said leg members from said retracted to said extended position, and said second drive member accessible to the foot to accomplish the final drive to said extended position;
   biasing means, connected to said drive means, for driving said leg members to said retracted position, said drive means loading said biasing means when said leg members are driven to said extended position; and
   means for locking said leg members in said extended position to inhibit retraction by said biasing means.

3. The carriage of claim 2 in which said first and second drive members extend longitudinally between said leg members of the back set and define between them a space into which the toe of the operator is insertable.

4. The carriage of claim 2 in which said means for locking includes transition locking means for locking said leg members in an intermediate position between said extended and said retracted positions to enable the operator to transfer the foot from one of said first and second drive members to the other of said drive members.

* * * * *